(12) United States Patent
Chang et al.

(10) Patent No.: US 8,349,469 B2
(45) Date of Patent: Jan. 8, 2013

(54) COMPOSITE ARTICLE MADE BY PROCESS FOR JOINING STAINLESS STEEL PART AND SILICON CARBIDE CERAMIC PART

(75) Inventors: Hsin-Pei Chang, Tu-Cheng (TW);
Wen-Rong Chen, Tu-Cheng (TW);
Huann-Wu Chiang, Tu-Cheng (TW);
Cheng-Shi Chen, Tu-Cheng (TW);
Wen-Feng Hu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/164,281

(22) Filed: Jun. 20, 2011

(65) Prior Publication Data
US 2012/0100381 A1    Apr. 26, 2012

(30) Foreign Application Priority Data
Oct. 25, 2010    (CN) .......................... 2010 1 0518274

(51) Int. Cl.
*B32B 15/04*    (2006.01)
*B32B 15/18*    (2006.01)
*B32B 18/00*    (2006.01)

(52) U.S. Cl. ........ 428/627; 428/610; 428/660; 428/663; 428/685

(58) Field of Classification Search .................. 428/610, 428/627, 660, 661, 663, 682, 684, 685, 446, 428/450
See application file for complete search history.

(56) References Cited

U.S. PATENT DOCUMENTS

2008/0255674 A1* 10/2008 Rahaman et al. .......... 623/23.11
2012/0107641 A1* 5/2012 Chang et al. .................. 428/623

* cited by examiner

*Primary Examiner* — Michael La Villa
(74) *Attorney, Agent, or Firm* — Altis Law Group, Inc.

(57) ABSTRACT

A process for joining a stainless steel part and a silicon carbide ceramic part comprising: providing a SUS part, a SiC ceramic part, a Mo foil and a Ti foil; placing the SiC ceramic part, the Mo foil, the Ti foil, and the SUS part into a mold, the Mo foil and the Ti foil located between the SiC ceramic part and the SUS part, the Mo foil abutting the SiC ceramic part, the Ti foil abutting the SUS part and the Mo foil; placing the mold into a chamber of an hot press sintering device, heating the chamber and pressing the SUS part, the SiC ceramic part, the Mo foil, and the Ti foil at least until the SUS part, the SiC ceramic part, the Mo foil and the Ti foil form a integral composite article.

6 Claims, 2 Drawing Sheets

COMPOSITE ARTICLE MADE BY PROCESS FOR JOINING STAINLESS STEEL PART AND SILICON CARBIDE CERAMIC PART

CROSS-REFERENCE TO RELATED APPLICATIONS

This application is related to U.S. Pat. No. 8,247,081, entitled "PROCESS FOR JOINING STAINLESS STEEL PART AND TITANIUM CARBIDE CERAMIC PART AND COMPOSITE ARTICLES MADE BY SAME". Such applications have the same assignee as the present application. The above-identified applications are incorporated herein by reference

BACKGROUND

1. Technical Field

The present disclosure relates to a process for joining a metal part and a ceramic part, especially to a process for joining a stainless steel part and a silicon carbide ceramic part, and a composite article made by the process.

2. Description of the Related Art

Stainless steel has excellent corrosion resistance and abrasion resistance, and is widely applied in the components manufacturing industry. However, unlike silicon carbide, stainless steel cannot maintain its physical properties when used in an environment of high temperature and strong corrosives. Therefore, a composite article comprising a stainless steel part and a silicon carbide ceramic part has a desirable performance of high temperature resistance, corrosion resistance, abrasion resistance, and usable in extreme environments.

A typical process for joining stainless steel and silicon carbide ceramic is by positioning one or more intermediate connecting layers between stainless steel and silicon carbide ceramic. However, due to differing rates of heat expansion, the bond between the stainless steel and the silicon carbide ceramic is not as stable as desired.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining stainless steel part and silicon carbide ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
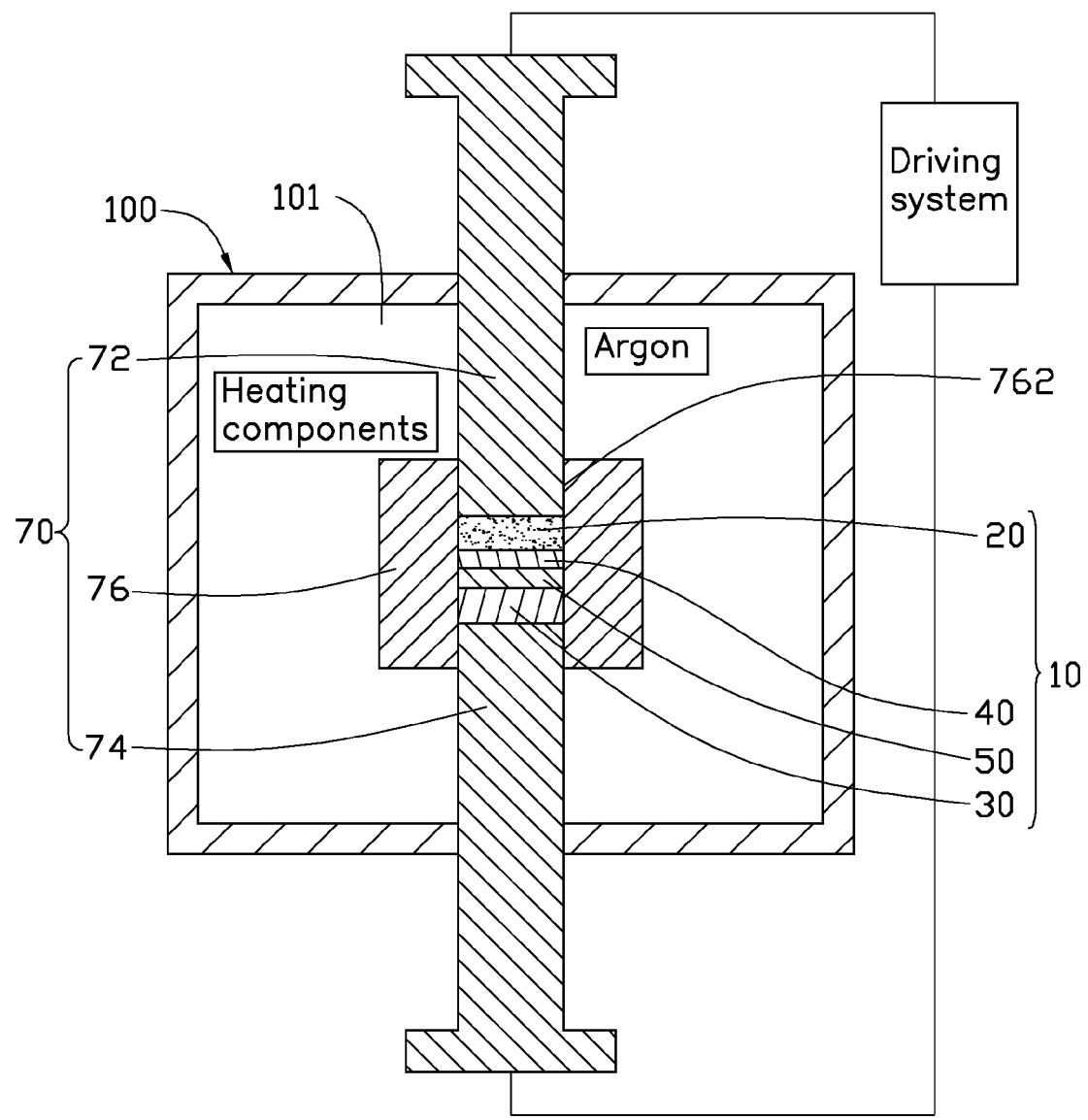
FIG. 1 is a schematic cross-sectional view of an example of a hot press sintering device for implementing the present process.

Referring to FIG. 1, an exemplary process for joining a stainless steel part and a silicon carbide ceramic part, may includes the following steps:

A silicon carbide(SiC) ceramic part 20, a molybdenum (Mo) foil 40, a titanium(Ti) foil 50 and a stainless steel(SUS) part 30 are provided. The Mo foil 40 and the Ti foil 50 are used as a joining medium between the SiC part 20 and the SUS part 30. The Mo foil 40 has a thickness in a range from about 0.1 millimeter (mm) to about 0.2 mm, the Ti foil 50 has a thickness in a range from about 0.2 mm to about 0.4 mm.

The SiC ceramic part 20, the SUS part 30, the Mo foil 40 and the Ti foil 50 are pretreated. The pretreatment may include the step of polishing the surfaces of The SiC ceramic part 20, the SUS part 30, the Mo foil 40 and the Ti foil 50 by sandpaper to produce smooth surfaces. Then, the SiC ceramic part 20, the SUS part 30, the Mo foil 40 and the Ti foil 50 are cleaned by placing them into an organic solution to remove grease from their surfaces. The organic solution can be ethanol, and/or other organic solvents. Then, the SiC ceramic part 20, the SUS part 30, the Mo foil 40 and the Ti foil 50 are rinsed with water and dried.

A clamping mold 70 is used to hold the SiC ceramic part 20, the SUS part 30, the Mo foil 40 and the Ti foil 50. The clamping mold 70 includes a pressing board 72, a corresponding supporting board 74 and a receiving board 76. The receiving board 76 defines a cavity 762 running through the upper/bottom surface to receive the SiC ceramic part 20, the SUS part 30, the Mo foil 40 and the Ti foil 50. The pressing board 72 and the corresponding supporting board 74 extend towards the cavity 762 from opposing directions and can be moved relative to the cavity 762 by a driving system such as hydraulic pressure system. The SiC ceramic part 20, the Mo foil 40, the Ti foil 50 and the SUS part 30 are placed into the cavity 762 and clamped by the pressing board 72 and the corresponding supporting board 74. The Mo foil 40 and the Ti foil 50 are inserted between the SiC ceramic part 20 and the SUS part 30. The Mo foil 40 abuts against the SiC ceramic part 20, the Ti foil 50 abuts against the SUS part 30. The pressing board 72 and the corresponding supporting board 74 from two opposite sides, brings the surfaces of the parts to be joined into tight contact, for compressing the SiC ceramic part 20, the Mo foil 40, the Ti foil 50 and the SUS part 30.

An hot press sintering device 100 including a chamber 101 is provided. The clamping mold 70 is placed into the chamber 101. The vacuum level inside the chamber 101 is set to about $10^{-3}$ Pa. Argon(Ar) is fed into the chamber 101 to maintain the chamber 101 pressure in a range of about 0.3-0.6 MPa. The pressing board 72 and the corresponding supporting board 74 press toward each other at about 10 Mpa to firmly clamp the SiC ceramic part 20 and the SUS part 30. Then, the chamber 101 is heated at a rate of about 10-50 degrees Celsius per minute (° C./min). When the temperature of the chamber 101 reaches to about 300° C., the clamping pressure applied by the boards 72,74 steadily increases, until the temperature of the chamber 101 reaches to about 1000-1200° C., and the clamping pressure reaches to about 10-40 Mpa. The pressure and heat are maintained in their respective peak ranges for about 30-60 min, so that the Mo foil 40 and the Ti foil 50 will interact with each other, and the Mo foil 40 interacts with the SiC ceramic part 20, and the Ti foil 50 interacts with the SUS part 30. Accordingly, the SiC ceramic part 20 and the SUS part 30 are connected by the Mo foil 40 and the Ti foil 50 to form a composite article 10. The composite article 10 is removed after the chamber 101 is cooled.

Figure 2:
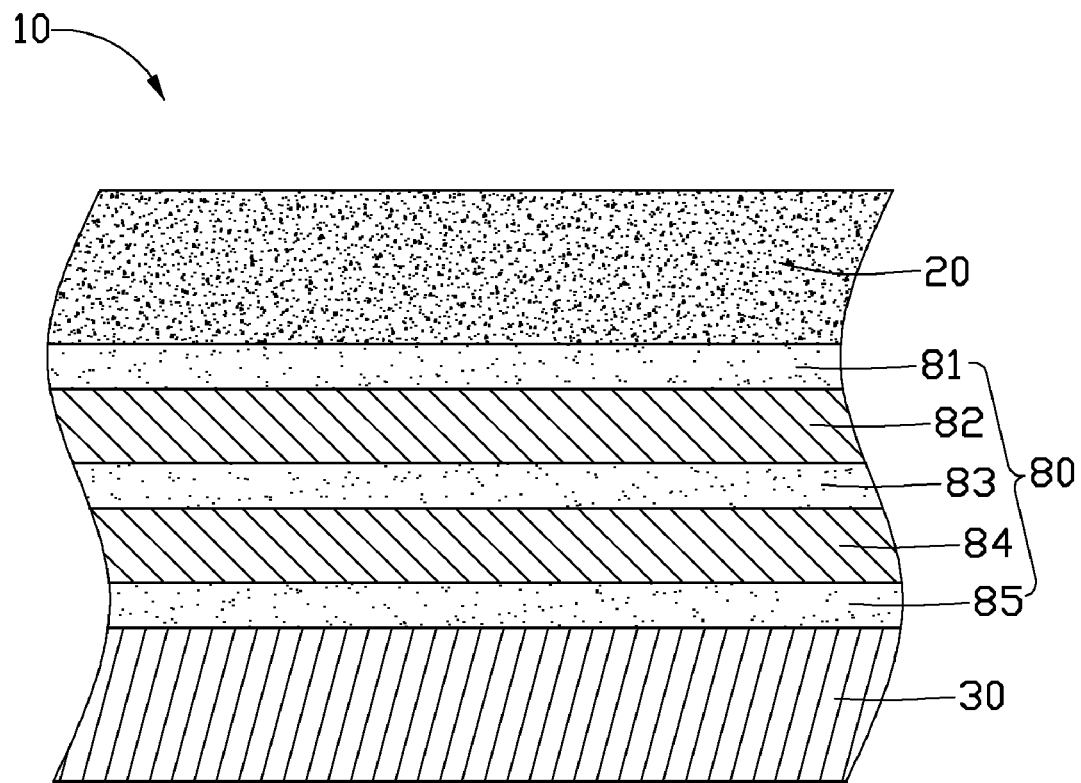
FIG. 2 is a cross-sectional view of an exemplary embodiment of the present article made by the present process.

Referring to FIG. 2, In the process of making the composite article 10, the Mo foil 40 and the Ti foil 50 act as intermediate layers to form a connecting layer 80 that connect the SiC ceramic part 20 and the SUS part 30. The heat expansion rate of SiC ceramic part 20 is approximately equal to that of the Mo foil 40, thus the SiC ceramic part 20 can substantially connect with the Mo foil 40. The heat expansion rate of the SUS part 30 is approximately equal to that of the Ti foil 50, thus the SUS part 30 can substantially connect to the Ti foil 50. Furthermore, the combination of the Mo foil 40 and the Ti foil 50 to form the connecting layer 80 results in a connecting layer 80 having a rate of heat expansion that gradually changes from one end to the other. Therefore, the SiC ceramic part 20 is securely connected with the SUS part 30 and more able to cope with temperature changes.

The composite article 10 manufactured by the present process includes the SiC ceramic part 20, the SUS part 30 and a multi-layered connecting layer 80 connecting the SiC ceramic part 20 to the SUS part 30. The connecting layer 80 is formed by placing the Mo foil 40 and the Ti foil 50 between the SiC ceramic part 20 and the SUS part 30, and then heating and pressing the SiC ceramic part 20 and the SUS part 30 as previously described. The various layers of the connecting layer 80 result from differing interaction between the SUS part 30, Mo foil 40, Ti foil 50, and SiC ceramic part 20. In particular, the connecting layer 80 includes:

a) a first transition layer 81: The first transition layer 81 mainly includes compounds comprising Mo element, C element and Si element, such as MoC, MoSi, etc. The compounds result from chemical reactions between adjacent portions of the SiC ceramic part 20 and Mo foil 40;

b) a Mo layer 82: The Mo layer 82 results from portions of the Mo foil 40 that do not react with either the SiC ceramic part 20 or the Ti foil 50;

c) a second transition layer 83: The second transition layer 83 is located between the Mo layer 82 and the Ti layer 84. The second transition layer 83 mainly includes compounds comprising Mo element and Ti element, and Mo with Ti solid solutions. The compounds and solutions resulting from chemical reactions between adjacent portions to the Mo foil 40 and Ti foil 50;

d) an Ti layer 84: The Ti layer 84 results from portions of the Ti foil 50 that do not react with either the Mo foil 40 or the SUS part 30; and e) a third transition layer 85: The third transition layer 85 is located between the Ti layer 84 and the SUS layer 30 and connects the Ti layer 84 and the SUS layer 30. The third transition layer 85 mainly includes compounds comprising Ti element and Fe element, and Ti with Fe solid solutions. The compounds and solutions resulting from chemical reactions between adjacent portions of the Ti foil 50 and the SUS part 30.

The thermal expansion rate of the connecting layer 80 gradually changes from a value close to that of the SiC ceramic part 20 (in the area of 81) to a value close to that of SUS part 30 (in the area of 85). This results in a composite article 10 well suited to temperature changes due to the gradual, rather than abrupt, changes in its internal thermal expansion rates.

Furthermore, the connecting layer 80 of the composite article 10 has no crack or aperture, and has a smooth surface. The composite article 10 has high hardness, high temperature resistance, corrosion resistance and abrasion resistance, a shear strength in a range from about 50 MPa to about 80 MPa, and a tension strength in a range from about 60 MPa to about 100 MPa.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A composite article, comprising:
a SiC ceramic part,
a stainless steel part, and
a connecting layer connecting the SiC ceramic part to the stainless steel part, wherein the connecting layer is formed by placing a Mo foil and a Ti foil between the SiC ceramic part and the stainless steel part with the Mo foil abutting to the SiC ceramic part and the Ti foil abutting the stainless steel part, then heating and pressing the SiC ceramic part, the stainless steel part, the Mo foil and the Ti foil, the connecting layer order includes a first transition layer adjacent the SiC part, a Mo layer, a second transition layer, a Ti layer, and a third transition layer adjacent the stainless steel part.

2. The composite article as claimed in claim 1, wherein the first transition layer located between the SiC ceramic part and the Mo layer mainly includes compounds comprising Mo element and C element.

3. The composite article as claimed in claim 2, wherein the compounds include MoC, and MoSi.

4. The composite article as claimed in claim 1, wherein the second transition layer located between the Mo layer and the Ti layer mainly includes compounds comprising Mo element and Ti element, and Mo with Ti solid solutions.

5. The composite article as claimed in claim 1, wherein the third transition layer located between the Ti layer and the stainless steel part mainly includes compounds comprising Ti element and Fe element, and Ti with Fe solid solutions.

6. A composite article, comprising:
a SiC ceramic part,
a stainless steel part, and
a multi-layered connecting layer connecting the SiC ceramic part to the stainless steel part, wherein the multi-layered connecting layer comprising:
a first layer adjacent the SiC part and comprising results of chemical reactions between SiC and Mo;
a second layer, adjacent the first layer and comprising Mo;
a third layer, adjacent the second layer and comprising results of chemical reactions between Mo and Ti;
a fourth layer, adjacent the third layer and comprising Ti; and
a last layer is adjacent to the stainless steel part and comprising results of chemical reactions between Ti and stainless steel.

* * * * *